May 19, 1953 — H. A. BAKKE — 2,639,307
OFFSET DAMPING OF ELECTRICAL MEASURING INSTRUMENTS
Filed June 10, 1950 — 2 Sheets-Sheet 1

Inventor:
Hans A. Bakke,
by Russell A. Warner.
His Attorney.

Inventor:
Hans A. Bakke,
by Russell A. Warner
His Attorney.

Patented May 19, 1953

2,639,307

UNITED STATES PATENT OFFICE 2,639,307

OFFSET DAMPING OF ELECTRICAL MEASURING INSTRUMENTS

Hans A. Bakke, Swampscott, Mass., assignor to General Electric Company, a corporation of New York Application June 10, 1950, Serial No. 167,436

3 Claims. (Cl. 171—95)

My invention relates to electrical measuring instruments and, in particular, to offset damping means therefor. The object of my invention is to modify and improve the magnetic damping characteristics of certain electrical measuring instruments in relation to the angular deflection in order that the damping will more nearly coincide with the angular position of the indicating pointer over the useful measurement range, in order to obtain a more nearly uniform damping and response time over such measurement range. The invention is particularly useful in instruments which employ a nonuniform flux distribution as, for example, those instruments having a logarithmic response characteristic.

Figure 1:
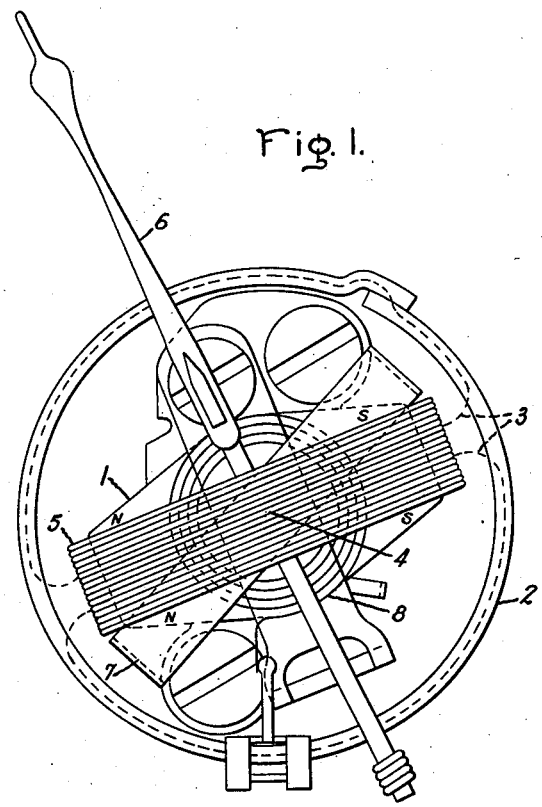
Figure 2:
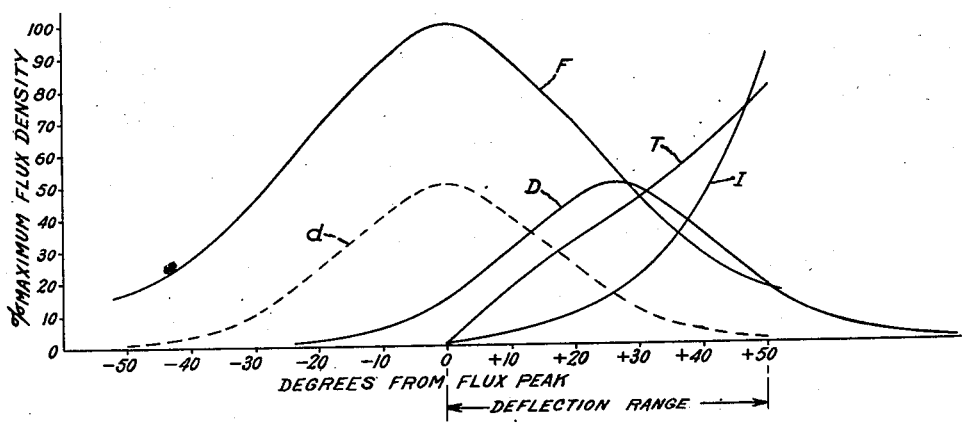
Figure 3:
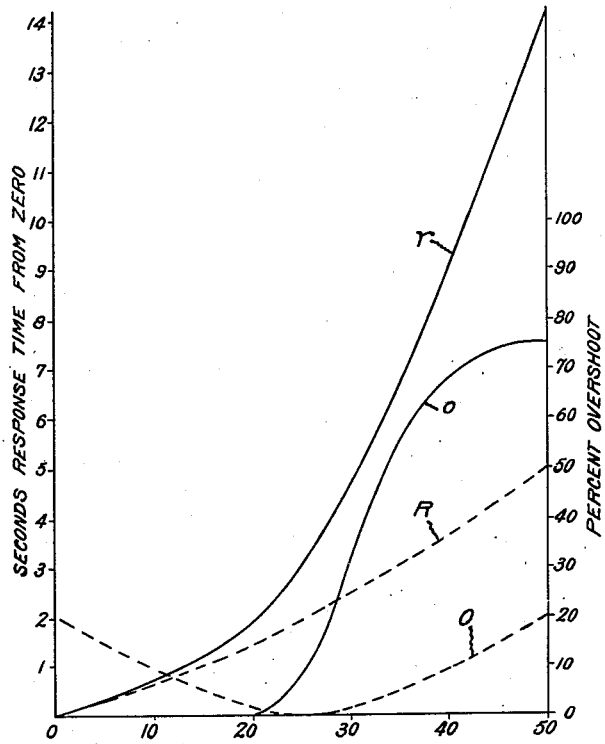
Figure 4:
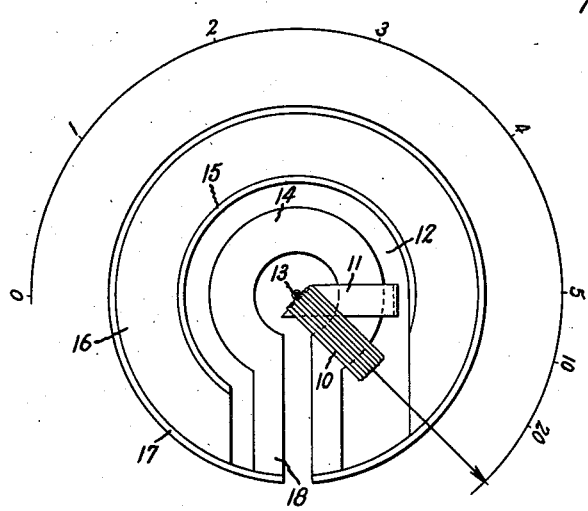
Figures 5, 6:
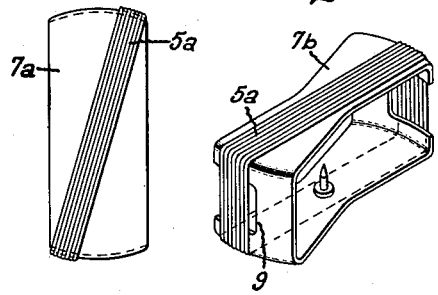

The features of my invention which are believed to be novel and patentable will be pointed out in the claims appended hereto. For a better understanding of my invention, reference is made in the following description to the accompanying drawing in which Fig. 1 shows a plan view of pertinent portions of a logarithmic response type of measuring instrument to which my invention has been applied. Fig. 2 shows flux distribution, current, armature torque and damping torque curves plotted with respect to angular deflection, which will be referred to in explaining the invention as applied to an instrument such as represented in Fig. 1. Fig. 3 shows comparative response and overshoot curves plotted against angular deflection before and after applying my invention to an instrument such as is represented in Fig. 1. Fig. 4 represents the application of my invention to a concentric scale type of instrument. Figs. 5 and 6 represent different details of armature coil damping shell arrangements that may be used in carrying out my invention.

In Fig. 1, I have represented portions of an electrical measuring instrument of a type used in logarithmic scale exposure meters. The stationary field is provided by an internal permanent magnet 1 of elongated shape with north and south poles at opposite extremities thereof. A stationary circular magnetic shell 2 surrounds the magnet 1 and is separated therefrom by an air gap and provides a flux return path for the permanent magnet 1, the general flux path being indicated by dotted lines 3. The instrument is provided with a moving element pivoted on an axis 4 and includes the armature coil 5, pointer 6, damping shell 7, and lead-in spirals which serve also as zero return springs and one of which is shown at 8. The armature assembly with its pointer is shown in approximately the deenergized zero indicating position for this type of instrument. The coil 5 is energized in such a direction that when energized, the armature will deflect in a clockwise upscale direction. The useful scale range is here assumed to be 50 degrees. Assuming that the armature coil 5 is energized from a photoelectric cell for the purpose of measuring light values, the current will increase with increase in light intensity from zero to a maximum over the deflection range of the instrument, in general corresponding to the curve I, Fig. 2. In Fig. 2 the abscissas represent degrees deflection of the armature coil from maximum flux air gap position, and the ordinates represent maximum air gap flux density at different armature coil positions.

Now in order to produce a logarithmic scale deflection and a deflection torque curve corresponding approximately to the curve T, Fig. 2, it is necessary that the armature be cut by a maximum flux field near zero deflection where the armature current is very small, and by a minimum flux field near maximum deflection where the armature current is very high. Consequently, a field flux distribution is provided in the armature air gap generally corresponding to the curve F, Fig. 2. This type of nonuniform air gap field distribution is provided by the magnetic field structure arrangement of Fig. 1, where the coil 5 lies in the area of maximum or peak air gap flux when in the zero indicating position and as it turns clockwise from that position, progressively moves into areas of rapidity decreasing flux strength. Thus, the curves I, T, and that portion of curve F to the right of zero degrees may be taken to represent in general the current, torque and field flux of the general type of instrument here under consideration over the useful deflection range.

In instruments of this type and in permanent magnet field instruments generally as heretofore built, instrument damping was often provided by using an armature coil supporting shell of conducting material, such as aluminum, which was centered with respect to the armature coil or coils so that the damping shell was always cut by the same field flux as the armature coil or coils. Thus, if the instrument of Fig. 1 were provided with an armature supporting damping shell in alignment with the armature coil, we would obtain damping characteristics generally as represented by the dotted line curve d where there would be maximum damping at and near the zero armature deflection point, and negligible damping at and near the maximum deflection point some 50 degrees upscale from zero. Such damping is proportional to the square of the damping flux so that we would have more than ten times as much damping at five degrees deflection as we would have at 45 degrees deflection. Obviously, such damping characteristics are not satisfactory.

According to my invention, the damping characteristics of such an instrument are greatly improved by angularly offsetting the damping shell relative to the armature coil in the direction of movement through the air gap and in a direction to increase the damping over the upper end of the scale and decrease it over the lower end of the scale, and provide maximum damping over the central deflection range where the instrument is likely to be most used.

Thus, in Fig. 1, the damping shell 7 is displaced from the armature coil 5 about 25 degrees in a counterclockwise direction so that when the armature coil is at midscale, the damping shell 7 will be in the maximum flux field of the air gap and will obtain damping characteristics represented by the full line curve D. It is noted that damping provided by the shell 7 has been decreased at the low end of the scale and increased at the upper end of the scale in curve D as compared to curve d, and that in curve D the damping at opposite ends of the deflection range is about one-third maximum. This greatly improves the damping characteristics of the instrument. The curves d and D are intended to represent the main instrument damping which is provided by armature shells. The armature coil itself will generally provide some damping, but it is relatively small and is not represented in Fig. 2. The damping shell 7 as offset from the armature coil as shown in Fig. 1 still provides support for the axial end portions of the coil and provides means for the axial support of internal pivots, lead-in spirals, and the like at and adjacent the axis of rotation. The coil 5 can readily be made sufficiently self-supporting by the insulation used or by a supplemental form or shell of insulating material to enable the invention to be used without difficulty.

In Fig. 3, I have represented comparison response time and overshoot curves for instruments of the type represented in Fig. 1 with and without my improvement. In Fig. 3, the abscissas represent degrees deflection where the useful scale length is 50 degrees. The ordinates for response time curves r and R are on the left in seconds response time from zero. The ordinates for curves o and Q are on the right in per cent overshoot. Curve r is for an instrument like Fig. 1, except having its damping shell in alignment with its armature coil, and curve R is for an instrument with an offset damping shell as in Fig. 1. From these curves it is noted that if the instruments be energized with currents corresponding to deflections of 40 degrees, it will take about nine seconds for the pointer of the old instrument to come to rest, due to insufficient damping for the deflection specified, whereas with my new damping arrangement it will take the pointer only about 3.7 seconds to come to rest. The difference is less for lower deflections and greater for larger deflections. It is further noted that my improved damping arrangement does not increase the response time near zero deflection even though the damping in this region is very much less than in the old arrangement. The per cent of overshoot for the old arrangement curve o is quite objectionable over the upper half of the scale where the instrument does not have enough damping and the overshoot varies from 30 to 75 per cent, whereas with my improvement curve O the maximum per cent overshoot is 20 per cent at the extremities of the scale and is negligible over the center region of the scale.

Figs. 5 and 6 illustrate moving armature coils equipped with my invention but providing very satisfactory support for the coil with the same shell that supplies the damping. In Fig. 5, 7a represents the damping shell and 5a the armature coil, the two being effectively offset or displaced from each other in their direction of movement through the air gap. The damping torque curve for an armature of this type in an instrument otherwise like Fig. 1 would be longer and flatter than the curves d and D of Fig. 2. The armature of Fig. 6 where 7b represents the damping shell and 5b the coil will produce damping generally corresponding to the curve D of Fig. 2, since most of the shell adjacent the air gap directly beneath the coil is cut away as represented at 9. When I mention the damping member being offset from the armature coil, I am referring to its effective damping action.

Fig. 4 represents my invention as applied to an instrument of the long concentric scale type. Here, 10 represents the armature coil and 11 the damping shell which rotate in the flux air gap 12 about axis 13. The air gap is bounded by the inner pole piece 14 and outer pole piece 15. The air gap flux is furnished by a C-shaped permanent magnet 16 which is polarized radially. The inner pole piece 14 is joined to the outer pole piece of the permanent magnet by a magnetic ring 17 and split magnetic tongue part 18. The air gap 12 is widened and the air gap flux weakened at the upper range of operation of the armature to extend the range and reduce the sensitivity at the upper end of the scale. When the armature coil 10 is deflected into this weak field range as represented in the drawing, the damping shell 11 is offset so that it remains in an air gap area of high flux density and thus provides sufficient damping even though the coil 10 is in a weak field.

What I claim as new and desire to secure by Letters Patent of the United States is:

1. An electrical measuring instrument comprising a stationary field structure which contains an air gap and being provided with means for producing a flux across said gap, the flux crossing said gap having a nonuniform distribution, an armature coil mounted for movement through said air gap from a region of high flux distribution to a region of lower flux distribution over its operating range, and a damping member having no external circuit connections secured to said armature coil and also movable through said air gap, said armature coil and damping member being angularly offset in their directions of movement by an amount of the order of ½ of the normal deflection range of said instrument so that when the armature coil is in a region of low air gap flux concentration the damping member is in a region of higher air gap flux concentration within the operating range.

2. An electrical measuring instrument comprising a stationary field structure containing an air gap and means for producing a flux through said gap, the flux crossing said gap being of nonuniform distribution, an armature coil mounted for movement through said air gap from a region of high flux distribution to a region of low flux distribution as the coil moves through its operating range in an upscale direction, and a damping member having no external circuit connections secured to and moved with said coil in said air gap, said damping member being angularly offset from said coil in a downscale direction so that when the armature coil is in its upscale low air gap flux distribution range of operation the damping member is in a region of higher air gap flux distribution.

3. An electrical measuring instrument of the logarithmic scale distribution type comprising a stationary magnetic field structure which contains an air gap and means for producing a flux across said gap, the flux in said air gap having a maximum density at one portion thereof and decreases in density in opposite directions from said one portion, an armature coil mounted for movement in said gap, said coil being biased to occupy a substantially maximum flux density air gap position when deenergized and to deflect in an upscale direction from such position over its operating range through progressively decreasing flux density air gap positions, and a damping conductor member, secured to and moved with said coil in said air gap, said damping member being angularly offset from said coil in a downscale direction so that as the armature coil is deflected upscale over its operating range the damping member moves from below, through to above the air gap portion of maximum flux density, said damping conductor having no external circuit connections and used solely for damping torque as distinguished from armature actuating torque purposes.

HANS A. BAKKE.

References Cited in the file of this patent

UNITED STATES PATENTS

| Number | Name | Date |
|---|---|---|
| 1,757,193 | Hotopp | May 6, 1930 |
| 1,933,327 | Hoare | Oct. 31, 1933 |
| 2,097,036 | Mori | Oct. 26, 1937 |
| 2,130,852 | Lunas | Sept. 20, 1938 |
| 2,566,783 | Van Urk | Sept. 4, 1951 |

FOREIGN PATENTS

| Number | Country | Date |
|---|---|---|
| 321,826 | Germany | May 3, 1918 |